Oct. 4, 1938.   F. HUMMEL   2,131,855
ICE CUBE HOLDER AND METHOD OF HANDLING ICE CUBES
Filed Sept. 14, 1937
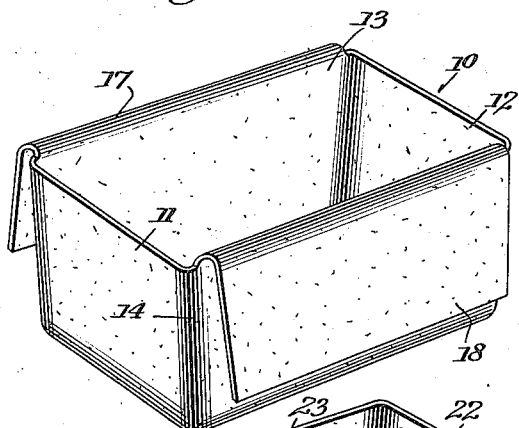
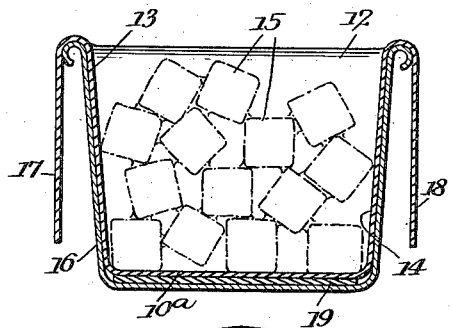
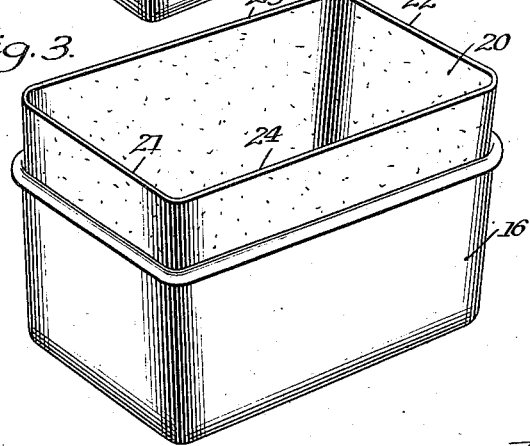
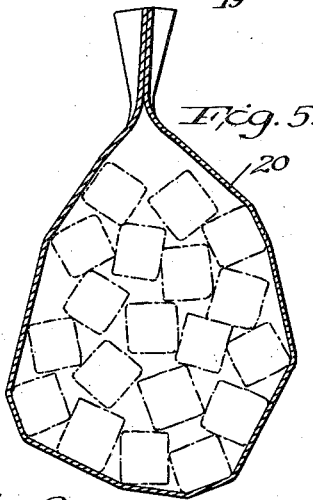
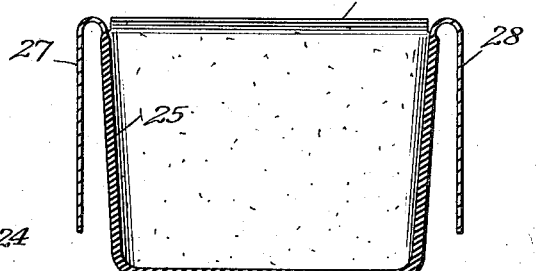
Inventor
Fred Hummel
Attorneys Patented Oct. 4, 1938

2,131,855

UNITED STATES PATENT OFFICE 2,131,855

ICE CUBE HOLDER AND METHOD OF HANDLING ICE CUBES

Fred Hummel, Hopewell, Va.

Application September 14, 1937, Serial No. 163,852

4 Claims. (Cl. 62—1)

The present invention relates to a method of handling ice cubes and to a container for the storage in a refrigerator of pre-frozen ice cubes in bulk and has as an object to provide a container or receptacle which may be manipulated upon removal from the refrigerator to separate the cubes which have become frozen together.

It is a domestic practice, for example, to remove the cubes from the trays of automatic refrigerators as the cubes are frozen and to store them in the refrigerators in bulk in a metal or other pan or container of substantial capacity. The tumbled cubes in the storage pan adhere not only to the latter, but also to each other as a result of the refrigerating action. Consequently, when it is desired to use the stored cubes, they must be broken away from the pan and from each other. Ordinarily an ice pick is used and as a result the pan is frequently injured and the cubes themselves are broken. The operation is wasteful and tedious.

The essential feature of the present invention is a receptacle or holder made of flexible rubber or other similar material to which ice is substantially nonadherent, the receptacle having a flap or upper side wall extension which may be folded or brought over the charge to confine the same so that the receptacle may be manipulated, as by rolling or kneading, to apply a torsion effect to the mass of cubes so as to separate those which have become frozen together. The receptacle may be designed for storage disposal in a pan of metal or the like or its charge-receiving portion may be made substantial enough, while still retaining requisite flexibility, to be self-sustaining.

Practical embodiments of the invention are shown by way of example in the accompanying drawing in which:

Figure 1 shows in perspective a receptacle of rubber or like material designed to carry out the objects of the invention.

Figure 2 is a cross-section of the receptacle of Figure 1 as disposed in a supporting pan of metal or the like.

Figure 3 shows in perspective a pan similar to that of Figure 2 and a rubber receptacle of modified form.

Figure 4 shows in a cross-section the elements of Figure 3 in a different relation.

Figure 5 shows the receptacle of Figures 3 and 4 in substantially the form it assumes during manipulation, and Figure 6 shows in cross-section a rubber receptacle whose charging portion is self-sustaining.

Referring to the drawing and first to Figures 1 and 2, reference numeral 10 designates generally a rubber receptacle having a bottom wall 10ª whose lower surface may be corrugated, integral end walls 11 and 12, and integral side walls 13 and 14 so that, as here shown, a charging portion substantially rectangular in horizontal section is provided, the charging portion, as particularly shown in Figure 2, being of a depth several times the maximum dimension of the usual ice cube 15. The receptacle walls are of sheet-like rubber and for sustension the receptacle may be placed in a metal pan 16, the side walls of the receptacle being co-extensive with those of the pan.

Side walls 13 and 14 have at their upper edges integral flaps or extensions 17 and 18 which, as here shown, are substantially rectangular and about as long as the side walls. When the container is in storage, the flaps 17 and 18 may occupy the depending position shown in Figure 2. However, when it is desired to remove the cubes for use, the flaps may be gripped to lift the receptacle from the pan and then folded across the top of the charge to confine the latter while the container is being manipulated to separate the cubes which have become frozen together, this condition being indicated in Figure 2.

If desired, a pad 19 of rubber or similar material may be interposed, during storage, between the bottom of the receptacle 10 and the pan 16 to eliminate any possibility of adherence of the two, and the pan may have a corrugated bottom and/or top face.

While in Figures 1 and 2, I have shown two flaps on opposite side walls, these being of a width to overlap it will be understood that any other holder or flap arrangement which will serve to confine the charge during manipulation may be used. Furthermore, it will be understood that the receptacle or holder is not confined in embodiment to the shape shown. It may be of any desired form and the pan may be designed accordingly.

In Figure 3 I have shown the same pan 16 as in Figure 1 and a receptacle 20 similar to the receptacle 10 except for the fact that its side and end walls all have extensions above the top of the pan and these are integrally joined so as to provide a peripherally continuous extension. The individual extensions are designated 21, 22, 23, and 24, respectively.

During storage, the extension may be folded over the outside of the pan in the manner indicated in Figure 4. When the receptacle is to be removed, the extension is folded upwardly and for purposes of manipulation may be brought together in the manner shown in Figure 5 so that it can be grasped in a single hand substantially as a bag. In Figure 5 the cubes are assumed to have been separated as the result of suitable manipulation of the receptacle.

The embodiment of Figure 6 is substantially the same as that of Figure 1, except that the walls as at 25 of the charging portion of the receptacle 26 are of heavier rubber so that this portion is self-sustaining. The integral flaps or extensions 27 and 28 are preferably of thinner gauge, as shown. Although the walls as at 25 are self-sustaining, they still retain a large measure of flexibility so that the receptacle may be manipulated in the manner already mentioned.

In all cases the surfaces of the rubber receptacles both inside and out may be corrugated or similarly configured since I have found that this formation reduces the tendency of the ice to stick to the receptacle and the receptacle to the pan, where a pan is used.

As has already been pointed out, substitution of material and variations in form and arrangement of parts may be made without departure from the invention and accordingly I do not limit myself in these respects except as in the following claims.

I claim:

1. In a container for the storage in a refrigerator of pre-frozen ice cubes in bulk, a pan of rigid material, and a receptacle of rubber or like flexible material to which ice is substantially non-adherent disposed in and removable from said pan, said receptacle having side walls co-extensive with the walls of the pan and a flap above said side walls, said flap being foldable over the charge in the receptacle to confine the same so that upon removal of the receptacle from the pan it may be manipulated to separate the cubes which have become frozen together during storage.

2. In a container for the storage in a refrigerator of pre-frozen ice cubes in bulk, a pan of rigid material, and a receptacle of rubber or like flexible material to which ice is substantially non-adherent disposed in and removable from said pan, said receptacle having side walls co-extensive with the walls of the pan, said side walls having upward extensions which may be folded over the outside of the pan side walls or over the charge in the receptacle to confine the same so that upon removal of the receptacle from the pan it may be manipulated to separate the cubes which have become frozen together during storage, said extensions being of sufficient length so that they can be brought together in the manner of a bag and grasped in one hand.

3. Means for the storage in a refrigerator of pre-frozen ice cubes in bulk, said means comprising a pan, and a flexible member of rubber or like material to which ice is substantially non-adherent, said member having a portion removably disposed in the pan for the reception of a charge of cubes and having opposite end portions which extend beyond the top of the pan and are foldable over the charge to confine the latter for manipulation whereby to separate the cubes which have become frozen together during storage.

4. The method of handling ice cubes which comprises placing a quantity of cubes in a flexible receptacle of rubber or like material to which the cubes are substantially non-adherent, storing the receptacle and cubes in a refrigerator; and, when the cubes are to be used, removing the receptacle and cubes from the refrigerator; closing the receptacle about the cubes to prevent loss of the latter therefrom; and, while maintaining the closed relation of the receptacle, manipulating the receptacle to separate from each other the cubes which have become frozen together during storage.

FRED HUMMEL.